June 13, 1939. J. VISSER Re. 21,118

ASH RECEIVER

Original Filed Dec. 21, 1935 2 Sheets-Sheet 1

INVENTOR
JOHN VISSER
BY Peter C McNulty
ATTORNEY

June 13, 1939. J. VISSER Re. 21,118

ASH RECEIVER

Original Filed Dec. 21, 1935 2 Sheets-Sheet 2

INVENTOR
JOHN VISSER
BY Peter C. McMulty
ATTORNEY

Reissued June 13, 1939

Re. 21,118

UNITED STATES PATENT OFFICE 21,118

ASH RECEIVER

John Visser, Grand Rapids, Mich., assignor, by mesne assignments, to F. L. Jacobs Company, Detroit, Mich., a corporation of Michigan Original No. 2,097,480, dated November 2, 1937, Serial No. 55,568, December 21, 1935. Application for reissue September 21, 1938, Serial No. 231,000

21 Claims. (Cl. 206—19.5)

My invention relates to ash receivers for use in automobiles and other similar places. The ash receiver of this invention relates particularly to improvements in concealed type ash receivers of the sliding drawer type.

An important object of this invention is to eliminate rattles so prevalent in ash receivers of this type when the automobile is in operation.

Another object of this invention is to greatly improve the action of the ash receiver during its sliding movements.

Another object of this invention is to have the sliding movement of the ash receiver take place under the control of a resilient spring throughout the entire length of its inward and outward travel.

Another object of this invention is to reduce the sliding friction incident to the sliding movements of the ash receiver to a minimum.

Another object of this invention is to positively stop the forward movement of the ash receiver at a predetermined point in its travel.

Another object of this invention is to provide a manually actuated means for readily releasing the ash receiver from the positive stop when necessary to remove the ash receiver from its mountings to empty the contents thereof.

Another object of this invention is to provide an ornamental front panel for the ash receiver.

Another object of this invention is to provide means whereby contact between the ornamental front panel and any ornamental panel in which the ash receiver is mounted for sliding movements is prevented.

Another object of my invention is to provide an ash receiver which may be readily made from stamped metal parts so that large quantities may be rapidly produced in exact duplication one with another at a low cost and yet attain the above objects.

The perfect ash receiver for an automobile would be one that works smoothly and freely through its entire travel in either direction and yet cannot rattle in any position. Also, one that can be easily and readily removed for emptying and replaced with equal ease.

In order to teach those skilled in the art how to practice my invention, I shall describe in the accompanying drawings which are made a part hereof, one preferred embodiment of my invention.

Figure 1:
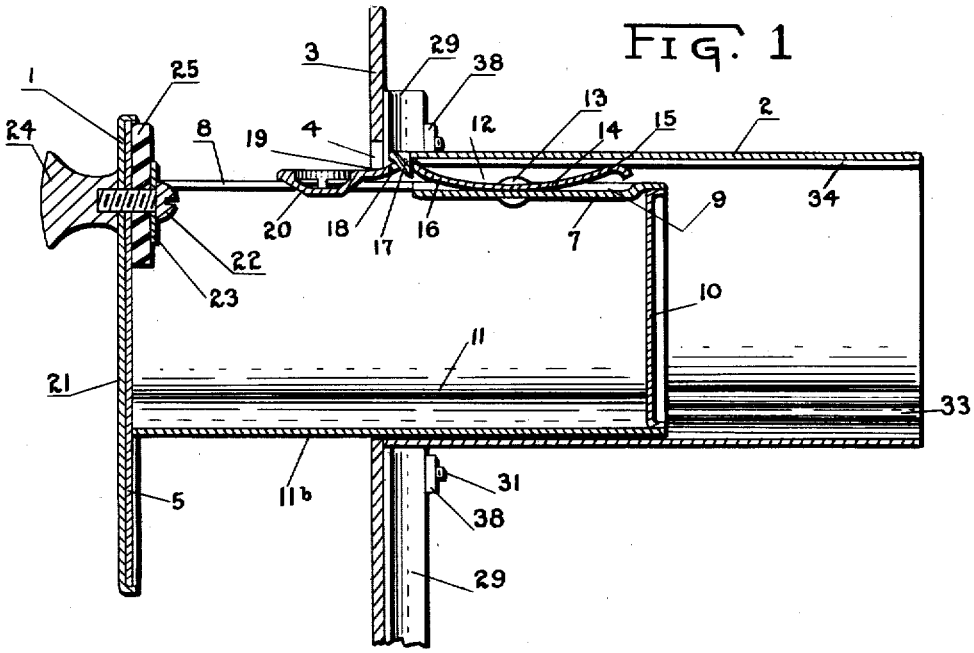
Figure 1 is a sectional view on the line I—I of Figure 3 through the ash receiver, its housing and a mounting panel, with the ash receiver adjusted to a forward position.

Referring more particularly to the drawings; from Figure 1 it will be seen that an ash receiving unit 1 of generally rectangular cross section is mounted for sliding movements within a housing 2, the housing being detachably fastened to a mounting panel 3, which has an opening 4 therein conforming in shape to the shape of the housing 3 and slightly larger in size than the housing.

The ash receiving unit 1 has a front wall 5 larger in size than the opening in the mounting panel 3 and of rectangular form. Attached to one side of plate 5 is the ash receiving box having two side walls 6, a top wall 7 with an opening 8 cut from its front portion and a rectangular depression 9 in its rear portion extending laterally of and symmetrical with the central axis of the box, a rear wall 10 and a bottom wall 11 formed to provide three faces 11*a*, 11*b* and 11*c*. The parts 5, 6, 7, 10 and 11 are all securely joined together, as by spot welding or in any other suitable manner to form a rigid box having an opening 8 in the forward portion of its top surface.

A double spring member 12 is fastened intermediate its ends to the top wall 7 of the box by two rivets 13. The spring member is located in the depression 9 in the top wall and is formed from flat spring stock of a width slightly less than the width of the depression 9. The rear portion of 12 is formed into an upwardly extending cantilever spring 14. The rear end of spring 14 is formed to provide a contacting rib 15, the purpose of which will be presently explained.

The forward portion of 12 is formed into an upwardly and forwardly extending cantilever spring 16 with a contacting rib 17, the central part of which is cut away to provide an opening 18. The spring 16 extends forwardly of the rib 17 and hole 18 as shown at 19, in a plane generally nearer the top wall 7 than the top of the rib. This forward portion 19 is formd into a handle member having an apertured depression 20 therein providing a finger hold for actuating the front spring 16 as will later be explained and for such other purposes as will readily be apparent to a smoker when using an ash receiver. The top surface of the contacting rib 15 of the rear spring 14 and the top surface of the contacting rib 17 of the front spring 16 provide for a minimum of friction against wearing ribs during sliding movements of the box 1 as will be later explained.

Figure 4:
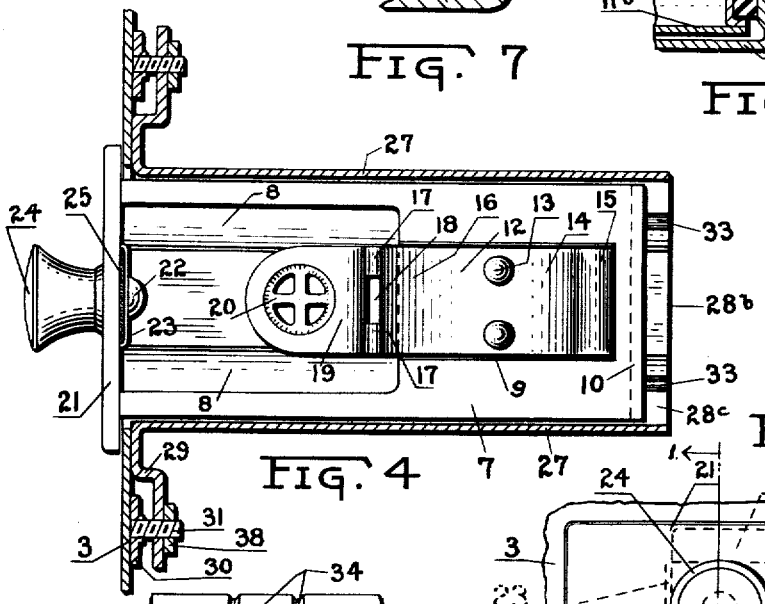
Figure 4 is a top view of the ash receiver with a part of the housing sectioned.
Figure 3:
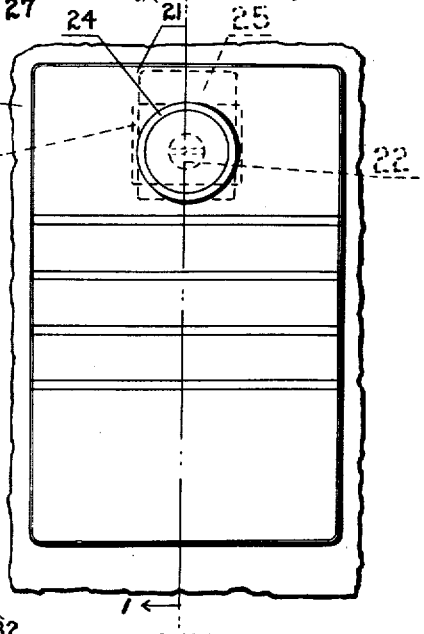
Figure 3 is a front view of the ash receiver in mounted position.

An ornamental panel or face plate 21 is provided to conceal the front plate 5. This is secured to the outer surface of plate 5 by a screw 22, channel shaped washer 23 and an ornamental knob or handle 24. A bumper member 25 is also secured against the rear surface plate 5 by the screw 22, washer 23 and knob 24, as shown in Figures 1, 3 and 4. Its purpose will later be explained. The edge portions of the ornamental plate 21 are flanged over as shown in Figure 1 to prevent the raw edges of the front plate from being visible.

Figure 2:
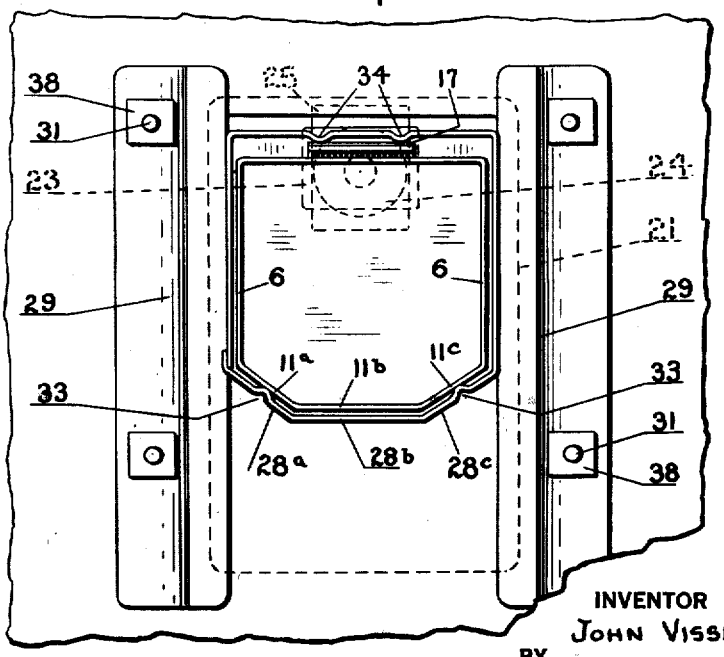
Figure 2 is a rear view of the ash receiver in mounted position.
Figure 6:
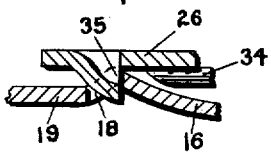
Figure 6 is an enlarged fragmentary view through stop 35.
Figure 5:
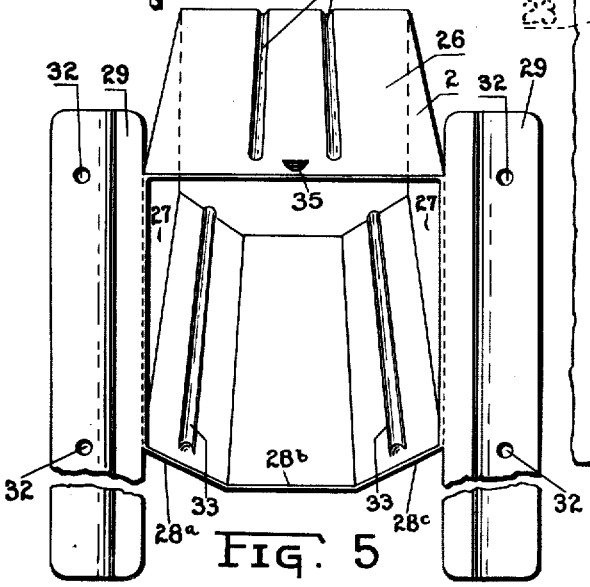
Figure 5 is an isometric view looking into the front end of the housing of the ash receiver.

The description thus far relates to the construction of the box unit 1 and I will now describe the construction of housing unit 2 within which the box unit 1 is mounted for sliding movements. The housing unit 2 is shown in section in Figure 1, in end view in Figure 2 and in isometric view in Figure 5. The housing has a top wall 26, two side walls 27 and a bottom wall having three faces 28*a*, 28*b* and 28*c* joined to form a hollow cylinder generally rectangular in form as best seen from the rear view in Figure 2. The housing does not have either a front or rear wall within the confines of the cylinder. Mounting wings 29 for fastening the housing unit 2 to the supporting panel 3 may be fastened to the side walls 27 of the housing or may be formed integral therewith and have a Z-shape as shown in Figure 4; the flange of the Z adjacent the side walls being in contact with the rear face of the mounting panel 3; the outer flange of the Z being spaced away from the rear surface of the mounting panel 3 to provide space for attaching by spot welding or otherwise to the rear surface of the mounting panel 3 the small plates 30 prior to applying the ornamental surface to the outer face of the mounting panel. I use four of these plates 30 each having fast thereto a screw 31. The wings 29 are provided with holes 32 spaced to fit over the screws 31 and to bring the opening of the housing to such position that the inner surface of its bottom walls 28*a*, 28*b* and 28*c* will be in line with the lower edges of the opening 4 in the mounting panel 3, these lower edges of the opening having a shape corresponding to the bottom walls 28*a*, 28*b* and 28*c* of the housing. The bottom walls 11*a* and 11*c* of the box 1 are placed at an angle to the horizontal as are the bottom walls 28*a* and 28*c* of the housing. The nuts 38 serve to hold the housing firmly against the rear wall of the mounting plate 3. The walls 28*a* and 28*c* are provided intermediate their points of contact with vertical and horizontal planes with longitudinal ribs 33 struck inwardly and extending from the rear edge to almost their front edges as shown in Figure 5. These ribs provide tracks for the slanting bottom walls 11*a* and 11*c* of the box to slide on during its in and out movements, thus reducing the friction of contact between these surfaces to a minimum. Likewise the upper wall 26 of the housing unit 2 is provided with laterally spaced ribs 34 formed inwardly and also extending from the rear edge longitudinally almost to the front edge, as shown in Figure 5. These ribs provide contact tracks for the rib 15 of the rear spring 14 and for the rib 17 of the front spring 16. The top wall 26 of the housing unit 2 is also provided with a stop 35 struck downwardly from the wall adjacent the front edge thereof as shown in Figures 1, 5 and 6. The rear edge of stop 35 is made for contact against the rear edge of the hole 18 in the front spring rib 17 thereby stopping forward movement of the box unit 1. The front portion of the metal struck down to form stop 35 is made sloping and without any contact surface so that when the ribs 15 or 17 contact with the sloping front surface of stop 35 when the box is in motion rearwardly the springs 14 and 16 will simply be depressed and the ribs will slide by the stop 35.

Figure 7:
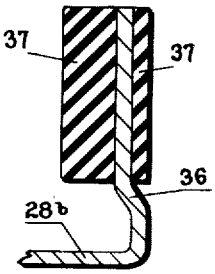
Figures 7 and 8 show a modified form of bumper to limit inward travel of the ash receiver.
Figure 8:
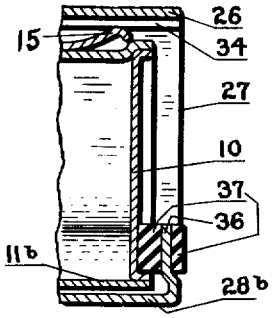

In Figure 7 and 8 is shown a modified form of bumper. When this type is used the front bumper 25 is to be omitted. Figure 7 shows a section through the box and housing adjacent the rear end. The bottom wall 28*b* of the housing is provided with an upstanding lug 36 fastened thereto or formed integrally therewith. A bumper 37 of fibre or other suitable material is placed around the lug 36 as shown in Figures 6 and 7. The bumper 37 may have an opening intermediate its faces by which it may be slipped onto lug 36 and located as to correct height by an offset in 36, as shown. By spacing the bumper 37 above the lower wall 11*b* of box 1 the bumper may be brought into contact with the outer surface of the rear wall 10 of the box and prevent the edges of the front ornamental panel 21 from touching the face of the mounting panel 3.

After the housing unit 2 has been mounted upon the mounting panel 3 the ash receiving box unit may be slid into the housing. This will compress the front and rear springs 16 and 14 by contact between ribs 17 and 15 of the springs and ribs 34 in the top wall 26 and create a pressure upon the lower ribs 33 by the sidewalls 11*a* and 11*c* and providing a tension in a vertical direction that prevents rattles and provides a smooth easy action during sliding movements of the box. When moving the box from closed to the open position for use as shown in Figure 1, a slight pull outward on the knob 24 puts the box into a movement forward. The motion takes place under the tension of both the front and rear springs 16 and 14 and is stopped when the rear edge of the hole 18 in the rib 17 of the front spring 16 abuts the edge of stop 35, best shown in Figure 6. In this position the hole in the top wall 7 is exposed through which ashes and unsmoked portions of cigars, cigarettes or the contents of a pipe may be emptied into the box 1. It will be seen from Figure 1 that when the box is in this position the actuating end 19 of the front spring 16 protrudes beyond the front face of the mounting panel 3 far enough to expose the entire apertured depression 20 which is shown in section in Figure 1 and in plan view in Figure 4. When the contents of the box requires emptying the box may easily and quickly be removed. Placing a finger in the apertured depression 20 and pushing downward releases the spring 16 from the stop 35 and the box may then be slid forward removed, emptied and replaced. The rear spring 14 continues to keep a tension applied to the movement of the box after the hole 18 has moved forwardly of stop 35 and when the box is being replaced it serves to provide an initial resistance to entering the housing unit 2 while being depressed so that the entering pressure will tend to move the box inwardly far enough to cause the hole 18 to pass beyond the stop 35.

It will be seen that my invention provides an ash receiver of the sliding drawer type in which all sliding movements inward and outward occur under a predetermined friction against movement that will remain constant throughout the length of travel from closed to open position. Also that when the box is to be removed from the housing for emptying, releasing the tension of the front spring to pass the stop does not release the tension of the rear spring during the remainder of the movement. The arrangement of the springs is such that considerable initial tension may be placed on them and the receiver box may be adjusted from closed to open position with no variation of the spring tension because there is no flexure of either spring during these movements. The only flexure that can occur is in the removal and replacing of the box as above explained. Of course, the apertured depression 20 when the box is in the open position shown in Figure 1 may be used to knock off ashes from cigarettes and cigars or to cut the burning portion loose prior to placing the remainder in the box.

The rear end of the box is covered by the top wall 7 and when in closed position the opening 8 in the wall 7 is closed by the top wall 26 of the housing. The box unit can always be moved towards open or closed position by a slight pull or push on the knob 24 as there is no lock between the box and the housing in either position. Forward motion is detachably stopped by the stop 35 but when so stopped the box is free to be pushed inward, likewise the bumper 25 will stop movement rearwardly but the box is free to be pulled forward without other resistance than the controlled friction under a predetermined spring tension.

The housing and box can be manufactured from stamped metal parts quite economically for large production and can be assembled in the factory and tested for proper action before shipment. The manufacturer of the automobile need then only mount the housing on the panel as above explained, and in so doing can not by improper location of any part furnished by him so mount the ash receiver that the ease of its movements can be spoiled by contact with other parts nor can its initial operating spring tension be altered. I have seen cases where ash receivers of other types were made useless by the car manufacturers failing to mount the receiver properly on the panel. Nothing like this can occur with the receiver of my invention. I have accomplished the elimination of vertical movement and lateral movement by the use of a semi-elliptical double cantilever spring and tracks at the bottom of the box. I have also provided positive stops for the movement of the box in either direction and an easy way to release the box from the forward stop when emptying is required. The receiver works smoothly and freely and yet cannot rattle in any position.

While I have shown and described my invention with reference to the particular details of construction of one preferred embodiment, it is to be understood that the invention may appear in different forms and with modifications and variations as suggest themselves to those skilled in the art, but I consider all such modifications and variations to be included within the scope of my invention.

What I claim is:

1. In a concealed type ash receiver of the sliding drawer type the combination of a supporting panel having an opening therein, one side of said panel having a finished decorative surface, a housing also having an opening therein, means for securing said housing to said supporting panel on the undecorated side in such position that a substantial portion of the opening in said housing will lie within the confines of the opening in said supporting panel, a receptacle adapted for sliding movement within the opening in said housing, said receptacle having a top opening for admission of ashes or the like, a semi-elliptical spring secured intermediate its end to said receptacle, said spring having end portions extending outwardly in opposite directions from said place of securement and formed to contact at spaced locations against an inner surface of said housing for yieldingly pressing said receptacle against said housing, stop means on said housing for engagement with one outwardly extending portion of said spring when said receptacle is moved to expose said top opening forwardly of said supporting panel, actuating means connected with the last said end portion of said spring and extending forwardly of said supporting panel whereby said end portion may be manually actuated to release it from said stop means to permit said receptacle to be entirely removed from said housing by further forward sliding movement during all of which the other end portion of said spring is resiliently pressing said receptacle against said housing.

2. In an ash receiver, a supporting wall having an opening therein, a tubular housing fixed thereto wholly on one side thereof with the axis of the tubular portion near the center of said opening, a box having an opening in its upper side slidably mounted in said housing, said housing having a top wall, a bottom wall and means for maintaining said walls in fixed relation to one another, longitudinally extending spaced track means in said bottom wall to provide bearing means between said bottom wall and said box, a pair of spaced ribs in said top wall extending lengthwise of said wall and protruding inwardly of said housing, a semi-elliptical spring wider than the distance between said spaced ribs secured intermediate its ends to said receptacle, said spring having cross-ribs adjacent its ends for contacting each said cross-rib against both said spaced ribs in said top wall of said housing providing a four point spring contact to resiliently press said box against said spaced track means.

3. In a concealed type ash receiver of the sliding drawer type the combination of a supporting wall having an opening therein, a housing fixed thereto and wholly on one side thereof, a box having an opening in its upper side and adapted for sliding movement within said housing, bearing tracks between said housing and said box, a pair of spaced ribs extending lengthwise in said housing above said box and protruding inwardly of said housing, a semi-elliptical spring wider than the distance between said spaced ribs secured intermediate its ends to the upper side of said box, said place of securement being positioned intermediate the ends of said box, the end portions of said spring being extended forwardly and rearwardly from said place of securement, each end portion also being extended upwardly to provide spaced end portions for resilient contact against said spaced ribs in housing above said box, whereby said sliding movement of said box may occur under a predetermined tension in said springs, means for stopping movement of said box forwardly towards open position and means whereby said box may be released from said stop means for further forward movement.

4. In a concealed type ash receiver of the sliding drawer type the combination of a supporting panel, having an opening therein and a finished decorative surface on one side, a housing also having an opening therein, means for securing said housing to said panel wholly on the unfinished side thereof and with said openings in substantial register, a box having a top opening adapted for sliding movement within said housing, a front panel larger than the opening in said supporting panel secured to said box, said front panel having a rearwardly extending flange around its perimeter and a finished decorative surface extending to the edge of said flange, spaced bearing tracks in said housing above and below said box, a semi-elliptical spring wider than the distance between said spaced tracks above said box secured intermediate its ends to said box, said place of securement being intermediate the ends of said box, one end portion of said spring being extended forwardly and upwardly and the other end portion being extended rearwardly and upwardly from the place of securement, each said end portion being formed to provide a bearing surface for contacting said spaced tracks above said box whereby said sliding movement of said box may occur under a predetermined tension in said springs, means for stopping movement of said box forwardly towards open position, means whereby said box may be released from said stop means for further forward movement, said means including an apertured actuating portion extending forwardly of said supporting panel, and means for limiting the movement of said box towards closed position.

5. In an ash receiver, a supporting wall having an opening therein, a tubular housing having means for attaching it to said supporting wall so that the axis of the tubular portion of said housing will be near the center of said opening and at right angles to the plane of said wall, said opening being larger than the tubular portion of said housing, a box mounted for sliding movement within said tubular portion, said box having an opening in its upper side, a front plate larger than the opening in said supporting wall and a handle exteriorly of said front plate, a leaf spring attached intermediate its ends to the upper side of said box and extending longitudinally thereof to form a front and a rear upwardly extending cantilever type leaf spring, each of said springs having a cross rib spaced from the point of attachment, said front spring having a portion of its cross rib cut away to provide a stop engaging means and also having an extension beyond said cross rib with an apertured depression therein whereby said spring may be manually depressed to disengage said stop engaging means, the tubular portion of said housing having interiorly of its upper side longitudinally extending track means to provide bearing means for the cross ribs of said springs when under tension, the tubular portion of said housing also having interiorly of its upper side and adjacent its front end stop means having a rearwardly facing edge and a forwardly extending sloping wall, said edge extending into the path of movement of the rear edge of the cut away portion in the cross rib of said front spring, and the tubular portion of said housing also having interiorly of its lower side longitudinally extending track means to provide bearing means for the bottom of said box during its sliding movements within said tubular portion under the tension of said cantilever springs.

6. The combination of claim 4 with means for preventing contact between said front plate and the front surface of said supporting wall.

7. In a concealed type ash receiver of the sliding drawer type, a housing having a horizontal top wall with longitudinally extending spaced ribs on its under side, said wall also having stop means adjacent one end, said housing also having a bottom wall formed to provide slanting surfaces, a longitudinally extending rib on the upper side of each of the said slanting surfaces of said bottom wall, means for maintaining said top and bottom walls in fixed relation to each other, and means whereby said housing may be fastened to a support.

8. In a concealed type ash receiver of the sliding drawer type, a housing having a horizontal top wall with longitudinally extending spaced ribs on its under side, said wall also having stop means adjacent one end, said stop means having an edge extending downwardly from said top wall and a surface sloping from said edge towards said end of said housing, said housing also having a bottom wall formed to provide slanting surfaces, a longitudinally extending rib on the upper side of each of the said slanting surfaces of said bottom wall, means for maintaining said top and bottom walls in fixed relation to each other and means whereby said housing may be fastened to a support.

9. In a concealed type ash receiver of the sliding drawer type, a housing having a horizontal top wall with longitudinally extending spaced ribs on its under side, said wall also having stop means adjacent one end, said stop means having an edge extending downwardly from said top wall and a surface sloping from said edge towards said end of said housing, said housing also having two vertical side walls fixed to said top wall, a bottom wall fixed to said side walls, said bottom wall being formed to provide two slanting surfaces, a longitudinally extending rib on the upper side of each of the said slanting surfaces of said bottom wall, and means whereby said housing may be fastened to a support.

10. In a concealed type ash receiver of the sliding drawer type, a semi-elliptical centilever spring, means intermediate the ends of said spring whereby it may be fastened to a support, one part of said spring extending upwardly and away from said means, a laterally extending rib formed in said part adjacent its end, the other part of said spring extending upward and away from said means in a direction opposite to that of said first mentioned part, a laterally extending rib formed in said other part intermediate said means and the end of said other part, a portion of last said rib being cut away, the outer portion of said other part beyond said rib lying below the top of said rib and having an apertured depression therein.

11. In a sliding drawer concealed type ash receiver the combination of a supporting panel having a front and rear side, the front side being provided with a finished decorative surface, an opening in said panel, a laterally extending member secured to said panel on its rear side and adjacent said opening, tracks in said member, a sliding drawer type receptacle mounted for sliding movement within said opening and along said tracks, an opening in the upper side of said receptacle for the admission of ashes or the like, said receptacle being provided with a front panel larger than the opening in said supporting panel, the perimeter of said front panel being formed into a rearwardly extending flange, said front panel and said flanged perimeter having a finished decorative surface, means movable with said receptacle whereby the rear edge of said flange on said front panel is prevented from contacting the said finished decorative surface of said supporting panel, a leaf spring attached to said receptacle and provided with means for detachably locking said receptacle in its forward position, a portion of said spring extending forwardly beyond the decorative surface of said supporting panel whereby said spring may be actuated to release said receptacle for further forward movement to enable it to be entirely removed from its mounting for emptying its contents.

12. In a sliding drawer concealed type ash receiver the combination of a supporting panel having a front and rear side, the front side being provided with a finished decorative surface, an opening in said panel, a laterally extending member secured to the rear side of said panel adjacent said opening, tracks secured to said laterally extending member, a sliding drawer type receptacle mounted for sliding movement within said opening and along said tracks, an opening in the upper side of said receptacle for the admission of ashes or the like, said receptacle being provided with an ornamental front panel larger than the opening in said supporting panel, said front panel having a finished decorative surface, means associated with said receptacle whereby said front plate is prevented from contacting the finished decorative surface of said supporting panel, and stop means secured to said laterally extending member, said receptacle having one of its sides provided with a yieldable portion engageable with said stop means when said receptacle is moved forwardly to open position, said yieldable portion being accessible in front of the decorative surface of said supporting panel when said receptacle is in said forward position for manual actuation to release it from contact with said stop whereby said receptacle may be bodily removed from its mountings for emptying contents thereof.

13. The combination of claim 12 with stop means secured to said laterally extending guide member for contacting said receptacle to limit its rearward travel and prevent damage to the surface of the instrument panel.

14. The combination of claim 12 in which the lower portion of said laterally extending guide member is formed to provide tracks which are engaged by surfaces formed as a part of the walls of said receptacle.

15. An ash receiver of the longitudinal sliding drawer type for use in automobiles or the like, comprising an ash container structure and a supporting structure embracing the same, said container structure having walls formed with slide surfaces, said slide surfaces being in inclined opposite relation with respect to each other, said supporting structure having correspondingly disposed opposite slide surfaces in register and engagement with said inclined surfaces, one of said sets of surfaces being provided with longitudinally extending line-like contact means, said container and supporting structures having resilient means disposed between them, and said resilient means being arranged in pressure applying relation to said sets of surfaces.

16. An ash receiver for use in automobiles or the like, comprising an ash container structure and a supporting structure embracing the same, said container structure having walls formed with slide surfaces extending lengthwise of the supporting structure, said slide surfaces being in bowed opposite relation with respect to each other, said supporting structure having correspondingly disposed opposite slide surfaces for register and engagement with said bowed surfaces, one of said sets of surfaces including rib-like contact means extending longitudinally thereof, said container and supporting structures having resilient means disposed between them, and said resilient means being arranged in pressure-applying relation to said sets of surfaces, said resilient means comprising a yieldable portion normally engaged with the supporting structure to retain said container structure against detachment from said supporting structure and being disengageable from the latter by the flexing of said yieldable portion to remove the container structure after said container structure has been partly withdrawn from said supporting structure.

17. An ash receiver of the longitudinal sliding drawer type for use in automobiles or the like, comprising an ash container structure and a supporting structure embracing the same, said container structure having walls formed with slide surfaces, said slide surfaces being in bowed opposite relation with respect to each other, said supporting structure having correspondingly disposed opposite slide surfaces in register and engagement with said bowed slide surfaces, said container and supporting structures having resilient means disposed between them, and said resilient means being arranged in pressure applying relation to said sets of surfaces, said resilient means comprising a spring structure at the top of the container structure including a pair of independently movable portions, one of which constitutes a releasable latch in advance of the other portion and said other portion being rearwardly of said latch and continuing to apply resilient pressure after the release of said latch.

18. An ash receiver of the longitudinal sliding drawer type for use in automobiles or the like, comprising an ash container structure and a supporting structure embracing the same, said container structure having walls formed with slide surfaces, said slide surfaces being in bowed opposite relation with respect to each other, said supporting structure having correspondingly disposed opposite slide surfaces in register and engagement with said bowed slide surfaces, one of said sets of surfaces being provided with longitudinally extending line-like contact means, said container and supporting structures having resilient means disposed between them, and said resilient means being arranged in pressure applying relation to said sets of surfaces, said resilient means including a pair of independently movable members, one of which constitutes a releasable latch in advance of the other member and said other member being rearwardly of said latch and continuing to apply resilient pressure after the release of said latch.

19. An ash receiver of the longitudinal sliding drawer type for use in automobiles or the like, comprising an ash container structure and a supporting structure embracing the same, said container structure having walls formed with slide surfaces, said slide surfaces being in bowed opposite relation with respect to each other, said supporting structure having corrspondingly disposed opposite slide surfaces in register and engagement with said bowed slide surfaces, said container and supporting structures having resilient means disposed between them, and said resilient means being arranged in pressure applying relation to said sets of surfaces, said resilient means including a plurality of spaced spring portions connected to the top of said container structure longitudinally thereof with the outer spring portion formed to project to an accessible position upon partial withdrawal of said container structure so as to be thereafter manually disengageable from said supporting structure to permit a more complete withdrawal of the container structure, said outer spring portion including a projection deflectable by contact pressure against the supporting structure upon a re-insertion of the container structure in said supporting structure whereby said outermost spring portion may be passed into the confines of said supporting structure without requiring further manual manipulation of the same by the operator.

20. An ash receiver of the longitudinal sliding drawer type for use in automobiles or the like, comprising an ash container structure and a supporting structure embracing the same, said container structure having walls formed with slide surfaces, said slide surfaces being in bowed opposite relation with respect to each other, said supporting structure having correspondingly disposed opposite slide surfaces in register and engagement with said bowed slide surfaces, said container and supporting structures having resilient means disposed between them, and said resilient means being arranged in pressure applying relation to said sets of surfaces, said resilient means including a pair of spaced portions connected to the top of said container structure longitudinally thereof with the rearmost portion adjacent the rear or inner end of the container structure to exert a spreading pressure between said rear end and the top of the supporting structure to hold said rear end in tight frictional engagement with said slide surfaces of said supporting structure, the other and outermost portion being formed into a latch, said supporting structure including a shoulder engageable by said latch upon partial withdrawal of the supporting structure and said latch being arranged so as to be thereafter accessible for manual manipulation to disengage it from said shoulder without disturbing the spreading pressure applied by said rearmost portion.

21. An ash receiver of the longitudinal sliding drawer type for use in automobiles or the like, comprising an ash container structure and a supporting structure embracing the same, said container structure having walls formed with slide surfaces, said slide surfaces being in bowed opposite relation with respect to each other, said supporting structure having correspondingly disposed opposite slide surfaces in register and engagement with said bowed slide surfaces, said container and supporting structures having resilient means disposed between them, and said resilient means being arranged in pressure applying relation to said sets of surfaces, said resilient means including a pair of spaced portions connected to the top of said container structure longitudinally thereof with the rearmost portion adjacent the rear or inner end of the container structure to exert a spreading pressure between said rear end and the top of the supporting structure to hold said rear end in tight frictional engagement with said slide surfaces of said supporting structure, the other and outermost portion being formed into a latch, said supporting structure including a shoulder engageable by said latch upon partial withdrawal of the supporting structure and said latch being arranged so as to be thereafter accessible for manual manipulation to disengage it from said shoulder without disturbing the spreading pressure applied by said rearmost portion, said latch including a projection deflectable by contact pressure against said shoulder upon a re-insertion of the container structure in said supporting structure whereby said outermost spring portion may be passed into the confines of said supporting structure without requiring further manipulation of the same by the operator.

JOHN VISSER.

CERTIFICATE OF CORRECTION.

Reissue No. 21,118. June 13, 1939.

JOHN VISSER.

It is hereby certified that the name of the assignee in the above numbered patent was erroneously described and specified as "F. L. Jacobs Company" whereas said name should have been described and specified as F. L. Jacobs Co., of Detroit, Michigan, a corporation of Michigan, as shown by the record of assignments in this office; and that the said Letters Patent should be read with this correction therein that the same may conform to the record of the case in the Patent Office.

Signed and sealed this 1st day of August, A. D. 1939.

(Seal)

Henry Van Arsdale,
Acting Commissioner of Patents.